United States Patent [19]

Lemaire et al.

[11] Patent Number: 5,333,297
[45] Date of Patent: Jul. 26, 1994

[54] MULTIPROCESSOR SYSTEM HAVING MULTIPLE CLASSES OF INSTRUCTIONS FOR PURPOSES OF MUTUAL INTERRUPTIBILITY

[75] Inventors: Charles A. Lemaire, Zumbrota; Andrew H. Wottreng, Rochester, both of Minn.

[73] Assignee: International Business Machines Corporation, Armonk, N.Y.

[21] Appl. No.: 5,928

[22] Filed: Jan. 19, 1993

Related U.S. Application Data

[63] Continuation of Ser. No. 434,048, Nov. 9, 1989, abandoned.

[51] Int. Cl.$^5$ .................... G06F 15/16; G06F 13/374
[52] U.S. Cl. ................................ 395/500; 364/228.7; 364/230; 364/228.1; 364/246.8; 364/931.4; 364/931.46; 364/969.2; 364/DIG. 1; 395/375; 395/725
[58] Field of Search ................ 395/200, 375, 725

[56] References Cited

U.S. PATENT DOCUMENTS

| | | | |
|---|---|---|---|
| 3,614,745 | 10/1971 | Podvin ............................ | 364/200 |
| 4,073,005 | 2/1978 | Parkin ............................ | 364/200 |
| 4,199,811 | 4/1980 | Borgerson ...................... | 364/200 |
| 4,257,095 | 3/1981 | Nadir ............................. | 364/200 |
| 4,412,286 | 10/1983 | O'Dowd et al. ................ | 364/200 |
| 4,439,830 | 3/1984 | Chueh ............................ | 395/425 |
| 4,574,350 | 3/1986 | Starr .............................. | 364/200 |
| 4,594,655 | 6/1986 | Hao et al. ....................... | 364/200 |
| 4,604,694 | 8/1986 | Hough ........................... | 364/200 |
| 4,758,950 | 7/1988 | Cruess et al. .................. | 364/200 |
| 4,766,566 | 8/1988 | Chuang ......................... | 364/900 |
| 4,805,106 | 2/1989 | Pfeifer ........................... | 364/200 |
| 4,943,912 | 7/1990 | Aoyama et al. ................ | 364/200 |
| 5,175,829 | 12/1992 | Stumpf et al. ................. | 395/375 |

FOREIGN PATENT DOCUMENTS

| | | |
|---|---|---|
| 0086601 | 8/1983 | European Pat. Off. . |
| 0092610 | 11/1983 | European Pat. Off. . |
| 0301707 | 2/1989 | European Pat. Off. . |
| 0366432 | 5/1990 | European Pat. Off. . |

OTHER PUBLICATIONS

"Overlapped Operation with Microprograming" L. C. Higbie IEEE Transactions on Computers vol. C-27, No. 3 Mar. 1978 pp. 270-275.

"Highly Concurrent Engineering/Scientific Machine Organization" IBM TDB vol. 26, No. 10B, Mar. 1984 Grohoski et al.

*Primary Examiner*—Parshotam S. Lall
*Assistant Examiner*—Ken S. Kim
*Attorney, Agent, or Firm*—J. Michael Anglin

[57] ABSTRACT

A computer system in which each of certain critical instructions, all performing multiple main storage accesses to shared data, have the appearance of executing required main storage accesses atomically with respect to a predefined set or class of instructions.

The instructions in each set, referred to as relatively atomic instructions, are grouped together based on the data structure or object class they affect.

The computer system comprises: (a) shared memory means; (b) a plurality of processors, coupled to said shared memory means, wherein each processor has an instruction set divided into a plurality of instruction classes; (c) means for constraining an instruction in one of said classes running on one of said plurality of processors, to run atomically relative to any instruction in said class running on any other of said plurality of processors in said system; (d) means for signalling between said processors to indicate when an instruction in one of said classes is running and for providing an indication of which particular class the instruction is a member of; and (e) means for selectively delaying the operation of all other instructions in said particular class on every other processor in said system.

37 Claims, 6 Drawing Sheets

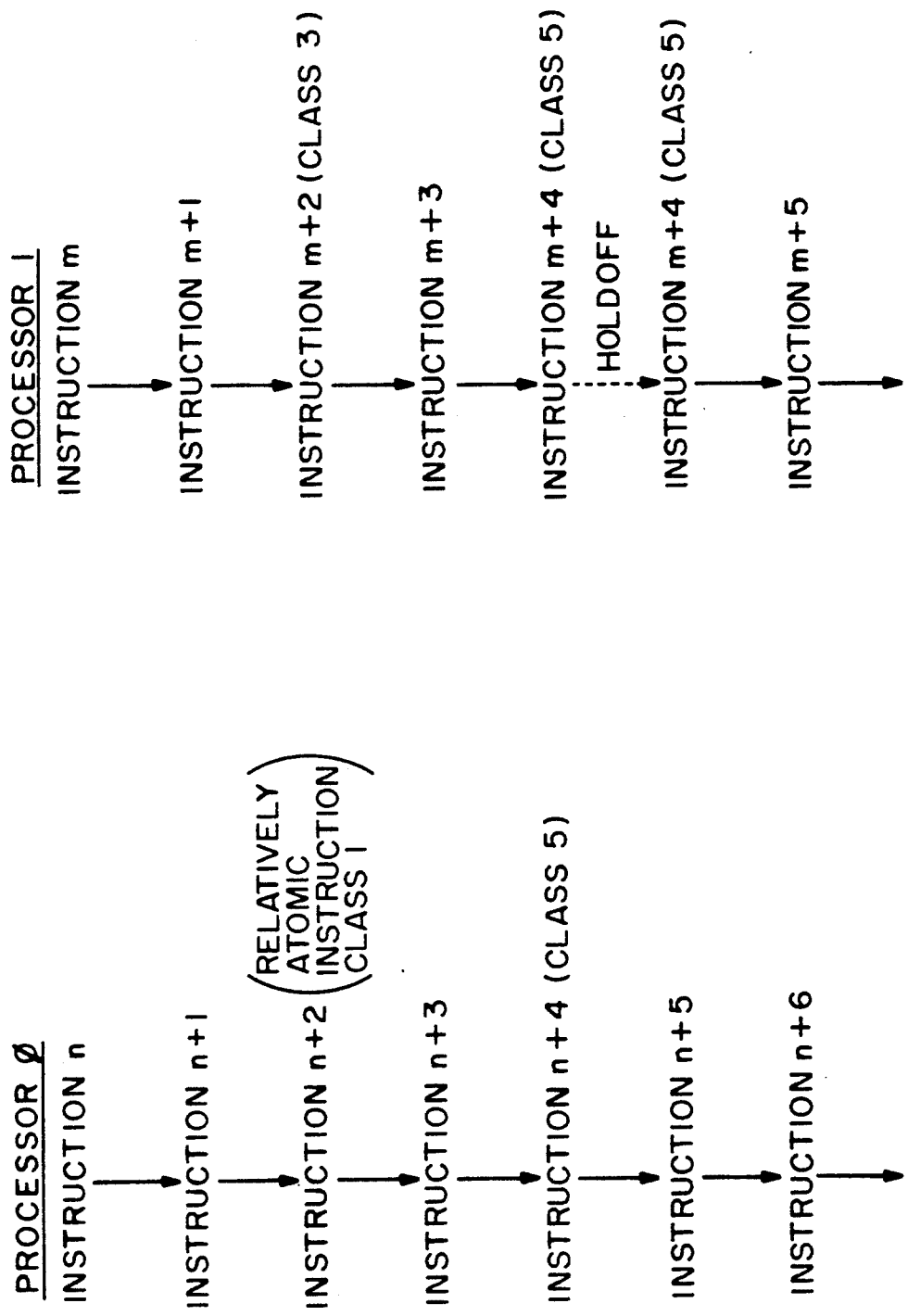

MULTIPROCESSOR SYSTEM HAVING MULTIPLE CLASSES OF INSTRUCTIONS FOR PURPOSES OF MUTUAL INTERRUPTIBILITY

This application is a continuation of U.S. patent application Ser. No. 434,048 filed Nov. 9, 1989, now abandoned.

1. Field of the Invention

BACKGROUND OF THE INVENTION

The present invention relates generally to multiprocessor computing systems which facilitate the simultaneous execution of multiple tasks in a single system. More particurlarly, the invention relates to methods and apparatus which allow each of certain critical instructions, all performing multiple main storage accesses to shared data, to have the appearance of executing required main storage accesses atomically with respect to a predefined set or class of instructions.

2. Description of the Related Art

In uniprocessor computer systems, which involve only a single processor executing a single task at any given time, the control of computer resources presents few problems. The type of resources being referred to includes memory, communication channels, I/O devices, etc., although other types of resources are understood to exist. In such systems, only the task being executed can have access to any of the systems' resources. Accordingly, each task maintains its control over any required resources, as well as the central processing unit itself, until the task has completed its activity.

In effect, each instruction in a uniprocessor system is designed to be "atomic", where an atomic instruction is defined to be indivisable, i.e., appears as a single unit of work. In a uniprocessor system, two instructions from two different task instruction streams cannot appear to execute at the same time (with interleaved fetches or stores) since task switches (where one task is swapped out before another is swapped in) are constrained to occur on instruction boundaries (or at intermediate checkpoints within an instruction for very long instructions).

By contrast, control of processor access to system resources is essential in multitasking and multiprocessor computer systems, since these systems allow simultaneous or interleaved execution of multiple tasks which share resources. Various prior art schemes have been developed to control such accesses, for example, task queues, locking schemes, etc.

In known computer systems that provide for multitask/multiple processor operation on shared data, such as the IBM System/370, certain critical instructions are defined, each of which perform multiple main storage accesses on shared data in an atomic fashion. In such a system, a critical instruction executing on a given CPU appears to perform all of its accesses (to a main storage location) without any other CPU being able to access the same storage location in between the first and last access by the given CPU.

In the IBM System/370, instructions such as TEST AND SET and COMPARE AND SWAP are defined, each of which perform multiple main storage accesses in a manner that is indivisable from start to finish (i.e., are atomic).

The TEST AND SET instruction can be used to fetch a word from memory, test for a specific bit and return a modified word to the memory, all during one operation in which all other tasks of the other processor(s) are barred from accessing that particular word in memory. The fetch and return store forms an atomic unit or atomic reference which, once begun, cannot be interrupted by or interleaved with any other CPU in the multiprocessor system.

With respect to the COMPARE AND SWAP instruction, the fetch of an operand (for the purpose of the compare) and the store (for the purpose of the swap) into this operands' location, appear to be a block-concurrent interlocked-update reference as observed by other CPUs. i.e., any other CPU will not appear to do any main storage fetch or store between the first CPU's fetch (for the compare) and store (for the swap). Thus, the main storage operations of the COMPARE AND SWAP also appear to be atomic as observed by other CPUs.

Obviously, in a multiprocessor environment like the IBM System/370, the fetch for the compare test, and the store for the set or swap, must be done without any other CPU either fetching or storing data to a locked location between the first CPUs fetch and store. The instruction must be performed atomically with respect to all other instructions capable of running on any processor in the system.

It is well known that the hardware can be used to lock a given main storage location to afford the required protection for an operand stored at the given location. Any other CPU's accesses to this location can simply be delayed or just the interlocked accesses for this location can be delayed. An operand location based hardware locking scheme is used to support the processing of atomic instructions in prior art computers typified by the IBM System/370.

The atomic instructions themselves, such as the TEST AND SET and COMPARE AND SWAP instructions described hereinbefore, are often used to provide software with the ability to test a software lock and then to set the lock if it is not already set. This software capability is a means of guaranteeing the integrity of some function which might not work if a software lock were not available. After completing one or more general-purpose instructions which do the accesses (e.g., a LOAD instruction), software must then use another instruction to release the software lock.

The use of these software locks requires the calculation of lock addresses. The system overhead associated with address calculation can be significant, particularly when, for example, a tight loop is executed containing a compare against the location containing a lock bit. In this example, frequent and repeated address calculation for a given location is often required, thereby degrading processor performance.

Accordingly, it would be desirable to be able to minimize the need to use software locks to preserve the integrity of a data structure (single location, linked list, etc.) thereby minimizing the need to perform the address calculations required when utilizing software locks.

Another scheme for preserving the integrity of shared data structures in a multiprocessor/multitask environment is an address locking mechanism based on partitioning shared memory and locking the partitions required by a CPU for the duration of a given atomic instruction. With such a scheme, processor performance degradation is an inverse function of the number of main storage partitions, in turn a function of the number of signals (identifying the partitions) that are provided between CPUs. Such a mechanism becomes unwieldly as the number of partitions grow, however, conceivably all instructions can be made to appear atomic. Still, lock bits for each partition and address calculations to check, set and release the locks are required. Thus, no substantial improvement (in terms of address calculation) is realized utilizing a memory partitioning scheme over the locking scheme described hereinabove with reference to the IBM System/370.

Another problem inherent in the prior art related to address calculation is the impact on software which results when taking a program designed to run on a uniprocessor and executing the program in a multiprocessor/multitask environment. As pointed out hereinbefore, controlling access to shared data locations, more generally to shared data structures, is critical in a migration from a uniprocessor to multiprocessor environment. Accordingly, it would also be desirable to minimize the impact on software resulting from such a migration by providing a computer system that utilizes means other then operand location based hardware locks and the aforementioned software locks to insure the data integrity of shared data structures.

Prior art computer systems are also known which employ a Tightly Coupled Microprocessor feature to increase system performance. A computer system having a Tightly Coupled Microprocessor feature allows multiple identical processors to be coupled to a shared memory interface and allows multiple tasks to execute simultaneously in a single system. Such a system would benefit significantly if means other then operand location based hardware locks and software locks were available to insure the integrity of shared data.

In fact, it would be desirable if a computer system were available where certain critical instructions were classified into instruction sets (i.e., were predefined) based on the data structures or object classes the instructions affect. Then (1) only the instructions in a given class would need be locked out when an instruction in the class is being executed and, (2) no address calculation would be required to lock out the instructions in a predefined class once any instruction in the class is identified as being executed by a given processor. Hardware could be used to lock out the remaining members of the instruction class.

In effect, instructions in each class would constitute a set of "relatively" atomic instructions. That is, rather then providing some atomic instructions that are atomic with respect to all instructions running on other processors (as in the IBM System/370); sets of relatively atomic instructions could be defined to guarantee that while a given relatively atomic instruction (from a given class) is executing, main storage facilities which are used by the relatively atomic instruction are not changed by other processors executing relatively atomic instructions from the same class.

Instructions not in the same class of an executing relatively atomic instruction would be allowed to operate simultaneously on other processors. By definition, i.e., by not being in the same class, these instructions cannot affect the data structure being utilized by the executing relatively atomic instruction.

As a result, processor performance across the desired multiprocessor system may improve relative to prior art systems. It would only be necessary to protect the particular data structure affected when a given relatively atomic instruction is being executed. The processors not executing instructions in the same class as the relatively atomic instruction would be free to continue processing.

Furthermore, a computing system which supports the processing of the aforementioned classes of relatively atomic instructions, would support software migration from uniprocessor to multiprocessor systems and minimize the need for software locks in general. This is because the integrity of shared data would be based on affected data structure type (which is invarient between a uniprocessor and multiprocessor environment) and, as indicated hereinbefore, identification of an instruction as a member of a given class would be all that is needed to "lock out" the other class members via a hardware locking scheme As a result the software locks required heretofore would be eliminated.

SUMMARY OF THE INVENTION

Accordingly, it is an object of the invention to provide a computer system that incorporates methods and apparatus for processing predefined classes (or sets) of instructions in a relatively atomic manner. In such a system each member of a given predefined class of instructions is constrained to execute atomically only with respect to the other instructions that are members of the same class.

It is a further object of the invention to provide a computer system in which instructions performing multiple accesses to shared main storage, give the appearance of the instruction being performed atomically, based on the data structures affected by such instructions.

It is still a further object of the invention to minimize processor performance degradation in a multitask/multiprocessor computing system by providing an alternative to software locks to protect the integrity of shared data.

It is another object of the invention to minimize the negative impact on software dealing with shared data objects, typically experienced when migrating from a uniprocessor environment to a multiprocessor environment, by providing data structure locking mechanisms that are software lock independent.

It is yet another object of the invention to provide a computer system that, in a preferred embodiment, supports the processing of relatively atomic instructions through the use of hardware and horizontal microcode which incorporate a lock mechanism into the relatively atomic instructions themselves.

According to the invention a computer system is described comprising: (a) shared memory means; (b) a plurality of processors, coupled to said shared memory means, wherein each processor has an instruction set divided into a plurality of instruction classes; (c) means for constraining an instruction in one of said classes running on one of said plurality of processors, to run atomically relative to any instruction in said class running on any other of said plurality of processors in said system; (d) means for signalling between said processors to indicate when an instruction in one of said classes is running and for providing an indication of which particular class the instruction is a member of; and (e) means for selectively delaying the operation of all other instructions in said particular class on every other processor in said system.

The invention features a computer system having an instruction set that includes relatively atomic instructions. The relatively atomic instructions are defined in terms of their division into instruction classes. Those instructions in each class are atomic relative only to instructions within the same class executing on all other processors in a multiprocessor system in which the processors share data processing resources, e.g., memory in a Tightly Coupled Multiprocessor system. Instructions not in the same class as the executing relatively atomic instruction are allowed to operate simultaneously on other processors.

According to the preferred embodiment of the invention, a relatively atomic instruction is defined in terms of the data structure it affects. Each relatively atomic instruction supported by the invention is guaranteed that while executing, the main storage facilities required by the instruction will not be changed by other processors which are executing relatively atomic instructions from the same class.

A further feature of the invention, according to a preferred embodiment, is the utilization of hardware and horizontal microcode to effect the lock mechanism for each relatively atomic instruction. An alternate embodiment of the invention features means for decoding relatively atomic instruction operation codes to effect the locking mechanism.

These and other objects and features of the invention will become apparent to those skilled in that art upon consideration of the following detailed description in conjunction with the accompanying Drawing.

BRIEF DESCRIPTION OF THE DRAWING

FIG. 1 depicts two instruction streams being processed in a multiprocessor environment that supports the execution of relatively atomic instructions in accordance with the principles of the invention.

DETAILED DESCRIPTION

Figure 2A:
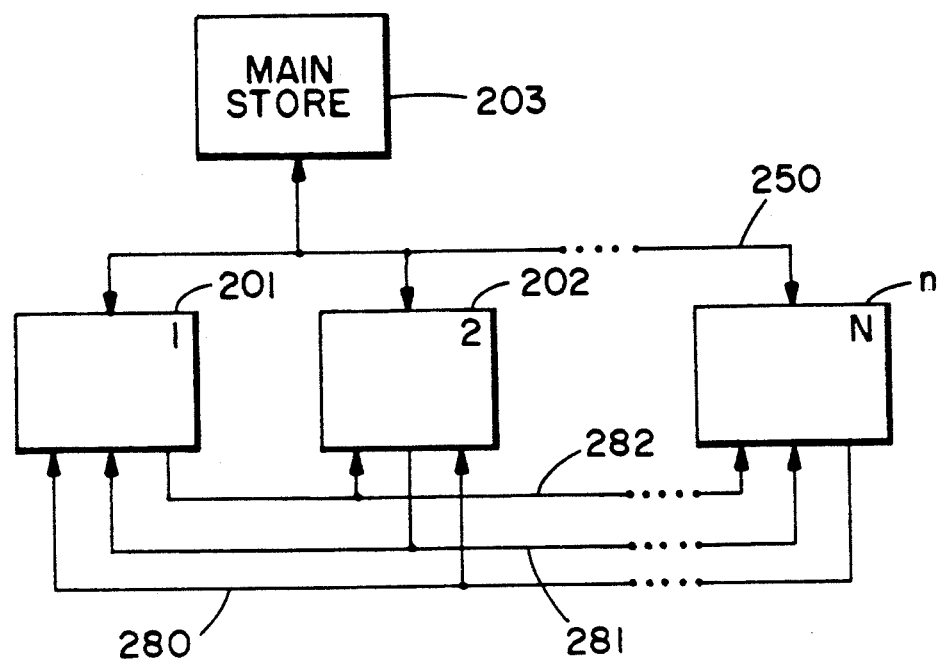
FIG. 2A depict, in block diagram form, a Tightly Coupled Multiprocessor computer system suitable for supporting the execution of relatively atomic instructions.

FIG. 1 depicts two instruction streams executing on two separate processors in a multiprocessor system. The processors, processor 0 and processor 1, share memory resources, and, for the sake of illustration, instruction n+4 in the stream depicted as being processed by processor 0, is defined to affect the same data structure as affected by instruction m+4 in the stream being processed by processor 1.

According to the invention, instruction n+4 and m+4 are assigned to belong to one of a plurality of classes (or sets) of relatively atomic instructions.

FIG. 1 illustrates that, according to the principles of the invention, instructions running on different processors belonging to different classes of relatively atomic instructions, can execute simultaneously; while an attempt to execute two instructions from the same class at the same time will result in a "holdoff" of the execution of one of the instructions.

For the sake of illustration, FIG. 1 depicts instruction n+2 as belonging to a first class of relatively atomic instructions, instruction m+2 is shown belonging to another class of relatively atomic instructions, instructions n+4 and m+4 are shown belonging to yet another class of relatively atomic instructions (the same class, arbitrarily named "Class 5"), with the remainder of the depicted instructions not being classified (i.e., not belonging to any set of relatively atomic instructions).

Processors 0 and 1 are shown to execute instructions n and m simultaneously. Instruction m+2 (arbitrarily in a relatively atomic instruction class named "Class 3") is shown executing on processor 1 at the same time instruction n+2 (arbitrarily a "Class 1" relatively atomic instruction) is executing on processor 0.

By definition, since instructions m+2 and n+2 are in different classes of relatively atomic instructions they do not affect the same data structure. Hence, according to the teachings of the invention, these instructions are permitted to be processed simultaneously.

Furthermore, according to the teachings of the invention, instructions not classified at all, such as instruction m+3, can be executed at the same time as a relatively atomic instruction. This is illustrated by the overlap of instruction n+4 (a relatively atomic instruction executing on processor 0) and instruction m+3 (executing on processor 1). Non-classified instructions are also shown running in parallel with each other, e.g. instruction n+6 on processor 0 and instruction m+5 on processor 1 are shown as being executed simultaneously.

Finally, the attempt by processor 1 to execute instruction m+4 while instruction n+4 is running will, according to the invention, result in the depicted "holdoff" of instruction m+4 until instruction n+4 is completed.

In principle, FIG. 1 depicts the desired operation of the processors in a system embodying the principles of the invention, where the "classes" are each predefined sets of instructions affecting a particular data structure or object class.

A suitable system for supporting the processor operation depicted in FIG. 1, i.e., for supporting the execution of relatively atomic instructions as defined herein, is shown in FIG. 2.

Figure 2B:
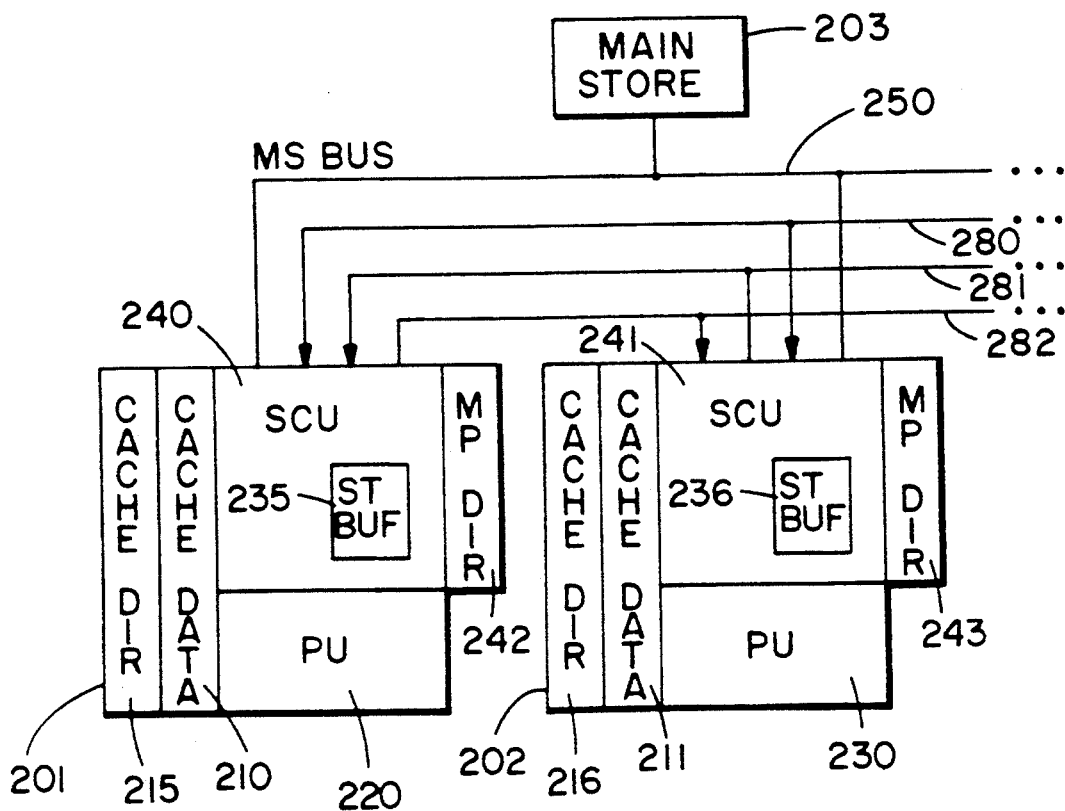
FIG. 2B is a more detailed view of two of the processors shown in FIG. 2A.

FIGS. 2A and 2B depict a block diagram of a Tightly Coupled Multiprocessor computer system. The processors are depicted in both FIGS. 2A and 2B as sharing the main store facility. Commercially available computer systems like the IBM System/370, typify the computer system illustrated.

FIG. 2A shows the illustrative multiprocesor system as having n processors, labeled as processors 201, 202, ..., n. These processors share main store 203 and are coupled thereto via main store bus ("MS Bus") 250. Two of the plurality of processors shown in FIG. 2A are shown in greater detail in FIG. 2B. In particular, FIG. 2B shows processors 201 and 202 coupled to main store 203 via main store bus ("MS Bus") 250.

The processors depicted in FIG. 2B include well known cache data memories (units 210 and 211) and associated cache directories (units 215 and 216). Also shown in FIG. 2B are the processing units (PU) themselves (units 220 and 230), storage control units (SCU) 240 and 241 and multiprocessor directories (MP DIR) 242 and 243 (typically used to assure cache coherency in a multiprocessor system). Each of the SCUs is further shown to include a storage buffer depicted as ST BUF 235 and 236.

The system depicted in both FIGS. 2A and 2B includes interprocessor signalling links 280, 281 and 282. Processors 201, 202, etc., in a multiprocessor system, communicate with one another for a variety of reasons. For example, interprocessor signalling can be used to maintain cache coherency, to perform bus snooping, etc. Interprocessor communications can be accomplished in a variety of well known ways, not constituting a part of the invention per se. For example, U.S. Pat. No. 4,718,002 to Carr, U.S. Pat. No. 4,663,709 to Fujiwara and U.S. Pat. No. 4,412,286 to O'Dowd, et al, all describe computer systems employing some form of interprocessor communication.

What is new is the utilization of interprocessor communications in a system such as the one depicted in FIGS. 2A and 2B, for setting, checking and resetting locks, and arbitrating for locks, where the locks are designed to support the processing of relatively atomic instructions as defined herein.

Figure 3:
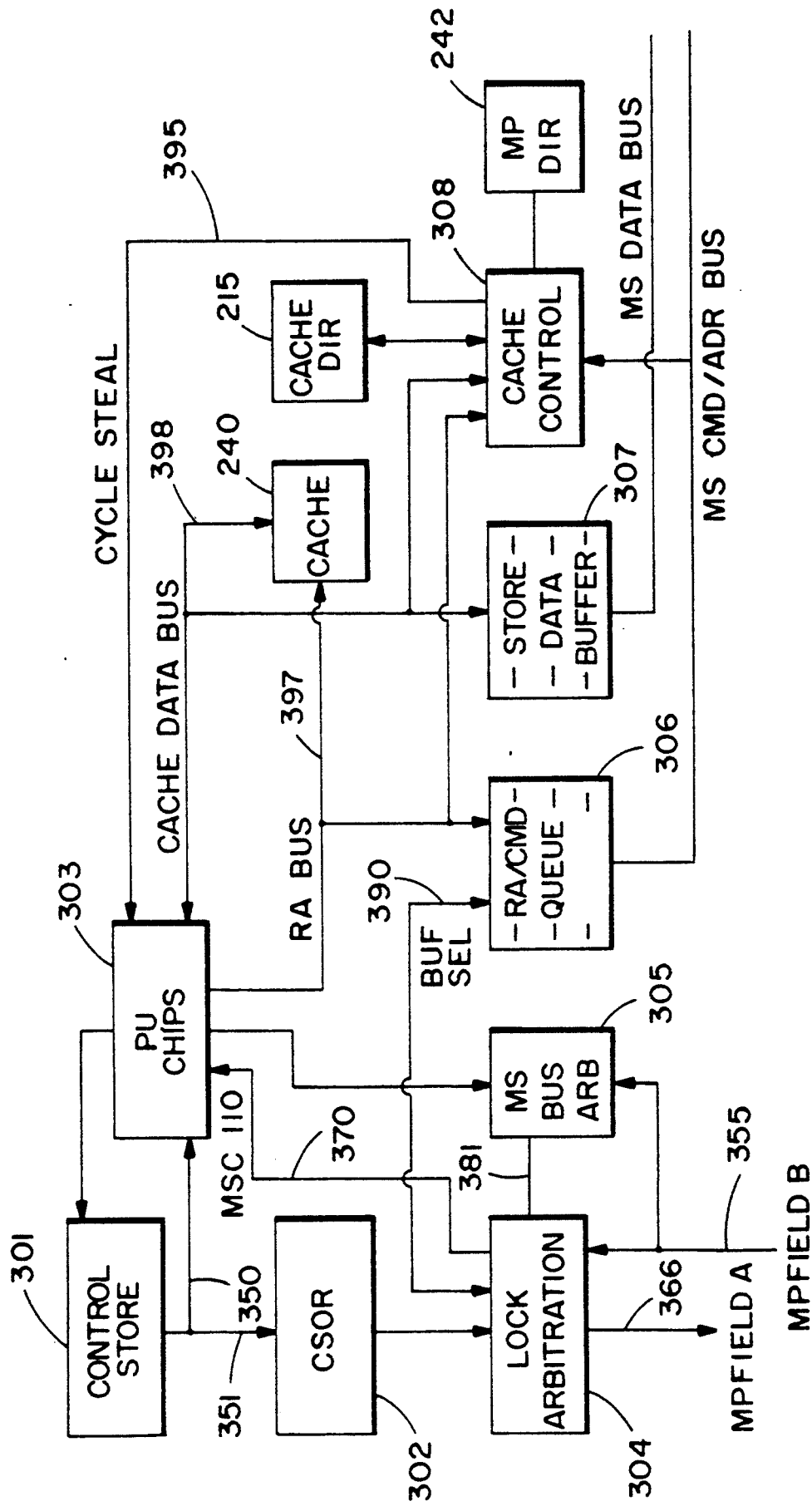
FIG. 3 depicts the details of one of the processing units depicted in FIG. 2B and particularly illustrates a set of hardware and control paths useful in implementing a preferred embodiment of the invention.

FIG. 3 depicts a preferred mechanism for supporting the processing of relatively atomic instructions in the context of a system like the one shown in FIGS. 2A and 2B. In the description to be set forth hereinafter, the interprocessor links shown in FIGS. 2A and 2B are for carrying the aforesaid lock information (and other information) between the processors.

Before describing the details of a hardware structure that supports the invention, illustrative object classes and exemplary instructions that could be included in each class, will be described. Criteria for improving system performance when designing relatively atomic instruction sets will be described as well.

The number of relatively atomic instruction classes defined is a processor design variable. Accordingly, to possibly improve system performance, i.e., reduce the degradation due to instructions from the same class trying to execute simultaneously, the size of each class could be reduced, while the number of classes defined could be increased, etc. By defining multiple classes of relatively atomic instructions the likelihood is reduced that more then one operation code from a given class will attempt to execute simultaneously. Accordingly, defining multiple classes of relatively atomic instructions is likely to reduce lock contention, processor hold-offs, etc., thereby improving system performance.

Object classes, according to the teachings of the invention, are defined in terms of a common data structure affected by class members. For example, a COMPARE AND SWAP class could be defined for the familiar IBM System/370 type COMPARE AND SWAP instruction (affecting a single location in the shared memory). Similar instructions such as a COMPARE AND SWAP HALFWORD, could be included in this class.

Another type of data structure which could be the basis for defining relatively atomic instructions is an I/O instruction queue. Entries into such queues are made by processors to, for example, move data between storage media (memory to disk, etc.). The entries are executed by I/O channels. As with other shared data structures, overwritting of queue entries is to be avoided and the definition of relatively atomic instructions based on this data structure can provide the desired protection.

Exemplary instructions in the I/O message queue class might include familiar I/O (Input/Output) and IOW (Input/Output and Wait) type instructions.

Still another exemplary data structure which could be the basis for defining relatively atomic instructions is a send/receive queue. This structure could be a message list (similar to the I/O queue), a linked list or some other type of queue. Complex instructions which add or delete messages from a queue would, for example, naturally fit into a relatively atomic instruction class based on a send/receive queue data structure.

Further classes could be defined for instructions affecting task dispatch queues, record claims, counter structures, various directories, etc.

Referring again to FIG. 3, it should be noted that the depicted components can be functionally grouped and mapped into the block diagram in FIG. 2B. In particular, control store 301, control store operation register (CSOR) 302, processor unit chips (PU chips) 303 and lock arbitration hardware 304 can be functionally grouped into the PU (block 220) shown in FIG. 2B. CSOR 302, lock arbitration logic 304, main store (MS) bus arbitration logic 305, real address/command (RA/CMD) queue 306, store data buffer 307 and cache control 308 can be grouped to functionally perform as the SCU block (block 240) depicted in FIG. 2B. RA/CMD queue 306 and store data buffer 307 combined, function as the ST BUF block (block 235) depicted in FIG. 2B. The remaining components depicted in FIG. 3 map directly onto their counterparts in FIG. 2B (cache 240, cache directory 215 and MP DIR 242).

The mapping indicates that the hardware depicted in FIG. 3 is capable of performing the functions of known systems, e.g., the IBM System 370. Additionally, departing from the prior art, the hardware elements depicted in FIG. 3 can be designed to support the definition and processing of relatively atomic instructions.

A detailed functional description of each of the blocks depicted in FIG. 3, and how they cooperate to support the definition and processing of relatively atomic instructions will be set forth immediately hereinafter. All that is assumed is that some instruction needs to be executed by a given processor (for example, processor 201 of FIG. 2B), and that the instruction has been fetched by PU chips 303 from either main store or cache. At initial fetch time it is not known whether an instruction is relatively atomic or not.

Typically, the fetched instruction is stored in an instruction register (not depicted in FIG. 3) associated with PU chips 303. Next, PU chips 303 access control store 301 to get the first control word in a sequence of control words needed to execute a given instruction.

It is at this point, according to one embodiment of the invention, that it can be determined whether or not the instruction fetched is relatively atomic. If a relatively atomic instruction was fetched then one of the control words in the sequence (preferably the first control word) will attempt to set a lock.

A preferred embodiment of the invention calls for extending known control store mechanisms to associate a lock code field with each of the control words for a given instruction. The lock code field can be used by a microcoder to specify lock number and specify whether the attempt is to get or release a given lock.

In this preferred embodiment, a given control word could be sent to PU chips 303 for processing while the lock code field associated with the word is channeled to CSOR 302. This is illustrated in FIG. 3. Sequential control words are shown provided to PU chips 303 via link 350 while the lock code field associated with a given control word is provided to CSOR 302 via link 351. Any attempt to set or release a lock is thus registered in CSOR 302. CSOR 302 itself can be implemented using a register or a latch.

Lock arbitration hardware 304 (1) keeps track of locks held and (2) recognizes locks that other processors are attempting to get. According to a preferred embodiment of the invention, lock arbitration hardware 304 uses an internal memory to keep track of locks held. Data provided by other processors (regarding their attempts to set or release locks) is provided over interprocessor link 355. The data packet from one other processor, referred to hereinafter as the "MPFIELD B", is shown in FIG. 3 to be input to the depicted processor via link 355. Not shown in FIG. 3 but contemplated in one embodiment of the invention is the use of separate MPFIELDs, over separate hardware links, for each processor in a multiprocessor system. Alternatively, a multiplexed busing scheme could be utilized.

The MPFIELD B input to a given processor is designed to convey not only external lock processor information, but main store bus arbitration information as well. This is illustrated in FIG. 3 with the MPFIELD B input on link 355 being split between lock arbitration hardware 304 (for the input lock information) and main store (MS) bus arbitration logic 305 (for the main store bus arbitration information).

When lock arbitration hardware 304 detects an attempt on the part of the depicted processor to get a lock (via CSOR 302 latching onto the appropriate lock code information from control store 301) then unit 304 broadcasts the attempt to the other system processors via interprocessor link 366. FIG. 3 depicts the "MPFIELD A" data packet being broadcast on link 366. The MPFIELD A information broadcast by the depicted processor (including MS bus arbitration information available to lock arbitration hardware 304 via link 381 and buffer select 340) becomes the MPFIELD B information (described hereinabove) for all other processors in the system.

If no other processor is recognized as having attempted to get the lock in question (in a prior cycle) then lock arbitration hardware 304 (assuming no conflicts to resolve during the current cycle) gets the lock. In this case PU chips 303 continue executing the control words sequentially provided via link 350 (i.e., execute the relatively atomic instruction fetched).

If another processor requested and obtained the lock in a previous cycle, then the lock arbitration hardware's memory will reflect this fact (the information having previously been provided to the depicted processor via link 355.) In this case PU chips 303 are place in a hold mode, i.e., are prevented from executing any other control words from control store. The "holdoff" can be accomplished via a signal on a holdoff link, depicted as link 370 in FIG. 3.

Finally, if during the same cycle both the depicted processor and another processor attempt to get the lock, lock arbitration hardware 304 needs to resolve the potential conflict. Any one of a number of schemes can be used, such as assigning processors fixed priorities, rotating priorities, etc. If the depicted processor loses the bid for the lock then lock arbitration logic 304 is updated to indicate which processor actually obtains the lock. In this case a holdoff signal is asserted on link 370 in the same manner as when another processor had obtained the lock in a prior cycle.

If the depicted processor wins the lock then no holdoff is asserted and, just as if there were no other bid for the lock, PU chips 303 continue executing the command words.

According to the preferred embodiment of the invention, the depicted processor broadcasts an MPFIELD A each cycle (on link 355) whether or not the lock is obtained. This practice could be varied without departing from the scope or spirit of the invention.

To understand the mechanism used in the preferred embodiment of the invention to effect lock releases, an understanding of how fetches and stores to shared resources can be handled in a multiprocessor system (like the one depicted in FIGS. 2A and 2B), is important. Although many possible schemes for handling fetches and stores are known to those skilled in the art, an exemplary scheme will be set forth immediately hereinafter for the sake of completeness.

Referring again to FIG. 3, buffer select link 340 can be used to signal real address/command queue 306 and store data buffer 307 (among other units) as to whether a given control word being executed by PU chips 303 is a fetch or a store. In other words, the indication of signal type is supplied to store buffer 235 as depicted in FIG. 2B (units 306 and 307 in FIG. 3). It will be seen hereinafter that keeping track of the number of stores is important to determining when to release a lock.

Fetches can be performed (1) by the PU chips putting out the fetch instruction signal on buffer select link 340; (2) by the PU chips providing the real address of the fetch via RA bus 397; and (3) by cache data bus 398 carrying fetched data back to the PU chips in the event of a cache hit. In the event of a cache miss, fetched data is carried back to the PU chips via the main store bus and the cache bus (the path between the main store bus and the cache bus is not depicted in FIG. 3). Cache control 308 can be used to determine whether or not a cache hit occurs.

Stores can be handled (1) by PU chips 303 putting out a signal on RA bus 397 to indicate the main storage address to which the store is targeted, (2) by the data being put out on data bus 398 and (3) upon the issuance of a store instruction signal by buffer select 340.

For performance reasons, it is well known to implement unit 235 of FIG. 2B as a buffer so that PU chips 303 do not have to wait for the main store bus to become available in order to continue executing control words.

Given this understanding of a typical fetch and store mechanism used in multiprocessor systems, the steps required before releasing a lock (originally set in order to facilitate the processing of a relatively atomic instruction) can now be described and appreciated.

When lock arbitration hardware 304 detects an attempt by the depicted processor to release a lock (via CSOR 302 latching onto the appropriate lock code information from control store 301), the following actions, according to the preferred embodiment of the invention, should be taken.

Since the processor depicted in FIG. 3 shares main store resources with other system processors, it would be desirable to protect all stores initiated by the depicted processor (to complete the execution of a given relatively atomic instruction) under the umbrella of the lock already being held. i.e.., lock arbitration hardware 304, according to the preferred embodiment of the invention, shouldn't release the lock until all previous stores initiated by processor 201 have had a chance to get on the main store bus.

The other system processors must also be given enough time to detect stores on the main bus via their cache control units and must be given enough time for each cache control unit to invalidate its associated cache directory if a cache hit occurs on any other processor's internal cache. The respective cache control units can detect stores on the main bus by, for example, bus snooping.

A cache control unit can determine if a main store location is copied in the cache over which the unit has control by (1) first looking up the main store location in a multiprocessor (MP) directory, such as MP directory 242 depicted in FIG. 3. If the location is in the cache, the cache control unit can get ownership of the appropriate buses (for example, RA bus 397) to change the valid bit to invalid in the cache directory and MP directory, by cycle stealing (shown accomplished via link 395 in FIG. 3).

Once all the stores have been put on the main store bus and enough time has passed to perform cache updates (if needed) then, a lock can be released.

Thus, even though an attempt to release is detected by lock arbitration hardware 304, the hardware must determine (1) if there are any stores initiated by PU chips 303 that have been placed in store buffer 235 which have not gone out onto the main store bus; (2) if a store is in process on RA bus 397, cache bus 398 and buffer select 340 during the cycle that a release is detected; and (3) when the last store in buffer 235 (units 306 and 307 in FIG. 3) goes out onto the main store bus.

The first enumerated objective can be accomplished by lock arbitration hardware 304 keeping track of the number of stores placed into store buffer 235. The second objected can be accomplished by monitoring buffer select link 340 of FIG. 3 for the store indicative signal referred to hereinbefore. The third objective can be accomplished via an input to lock arbitration hardware 304 from main store bus arbitration logic 305.

Finally, after the last store has been determined as having been put out on the MS bus, lock arbitration hardware 304 can put the lock release information onto link 366 as part of an MPFIELD A data packet.

The release processes is completed after the other lock arbitration units in the system update their internal memories (effectively release the lock) and arbitrate for possession of the released lock if in fact one or more of the other system processors is in the above described "holdoff" state.

What has been described with reference to FIG. 3 is a preferred embodiment of the invention in which the depicted combination of apparatus functions to support the definition and processing of relatively atomic instructions. Interprocessor signalling is achieved via a discrete wired approach.

Figure 4:
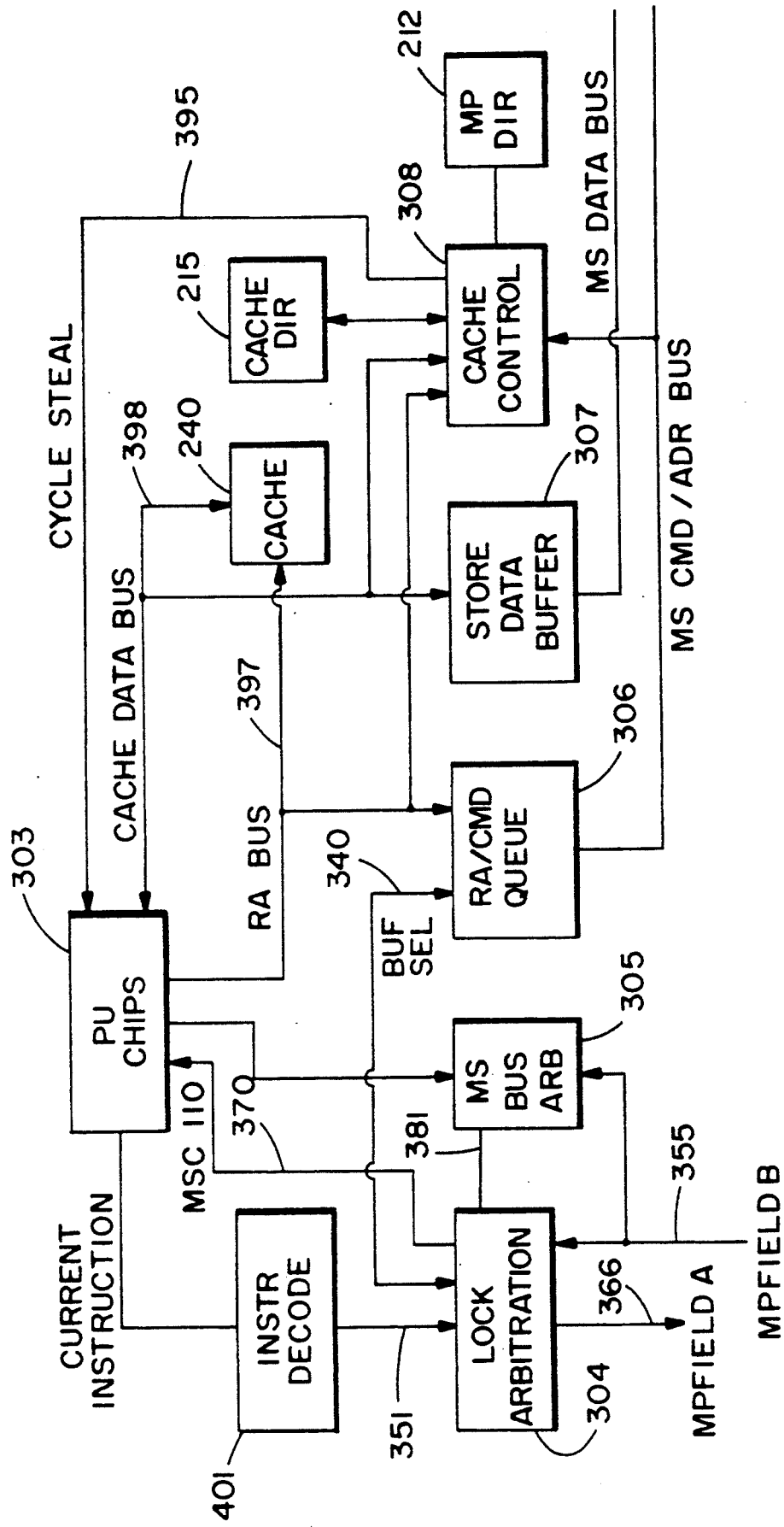
FIG. 4 depicts an alternative to the hardware and control path arrangement depicted in FIG. 2B, also suitable for implementing an embodiment of the invention.

The system depicted in FIG. 4 is meant to be the same as the one depicted in FIG. 3 (i.e., using a discrete wired approach to interprocessor signalling), except that instead of utilizing an extended control store, CSOR and microcode to effect the invention, a hardware decode mechanism is used as an alternative.

The alternative requires the encoding of relatively atomic instructions in some fashion (to distinguish them from non-relatively atomic instructions), and for providing the lock code information (lock number, get lock attempt, release attempt, etc.) to lock arbitration hardware 304 upon performing instruction decode. Instruction decode unit 401 is depicted in FIG. 4 for performing these functions, which are well within the ability of those skilled in the art to realize using standard decode logic, lookup tables, etc.

Figure 5A:
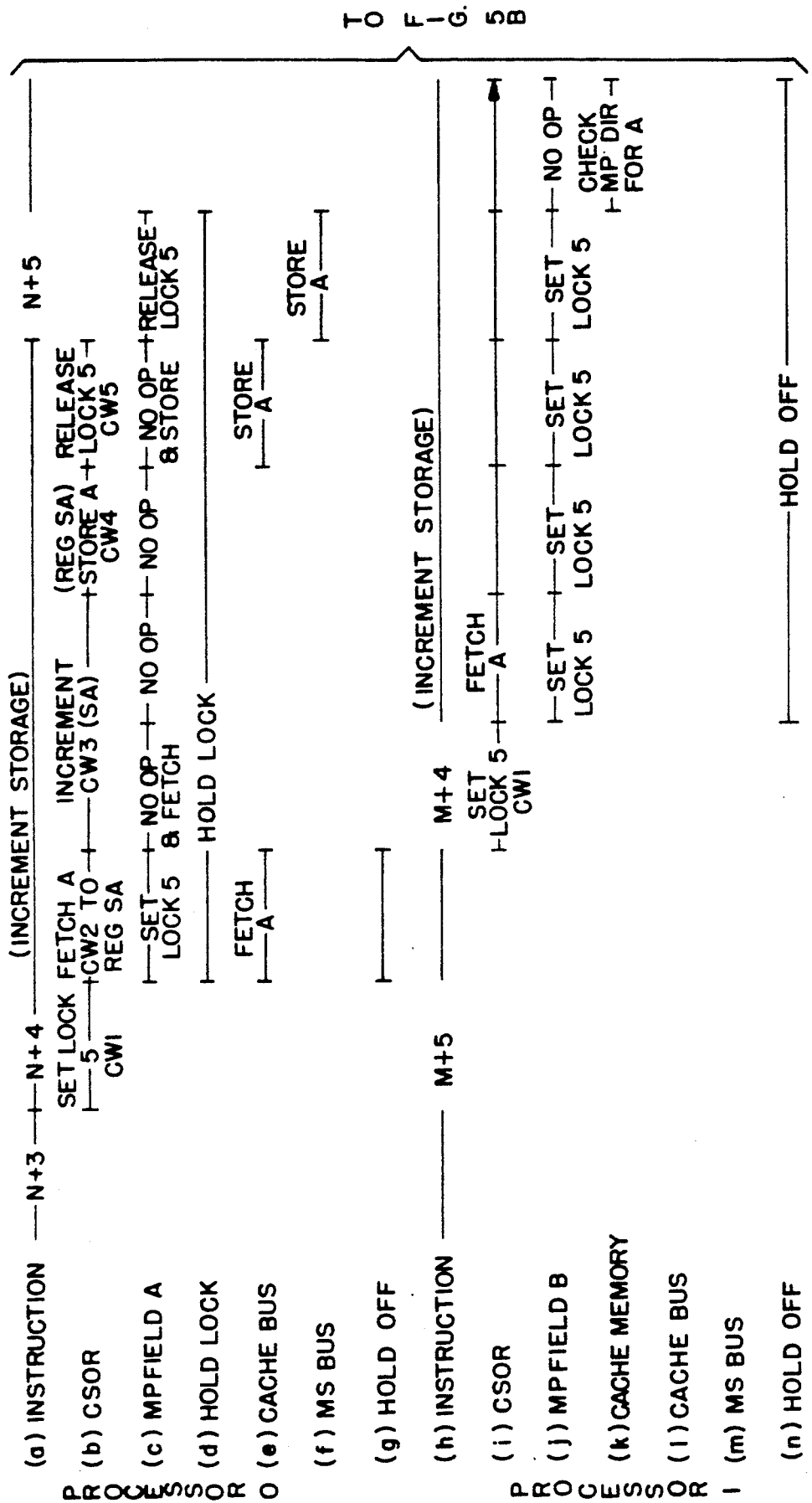
FIG. 5A and 5B together illustrates, by way of example, the cooperation required between a first and second processor over time in order to implement an embodiment of the invention.
Figure 5B:
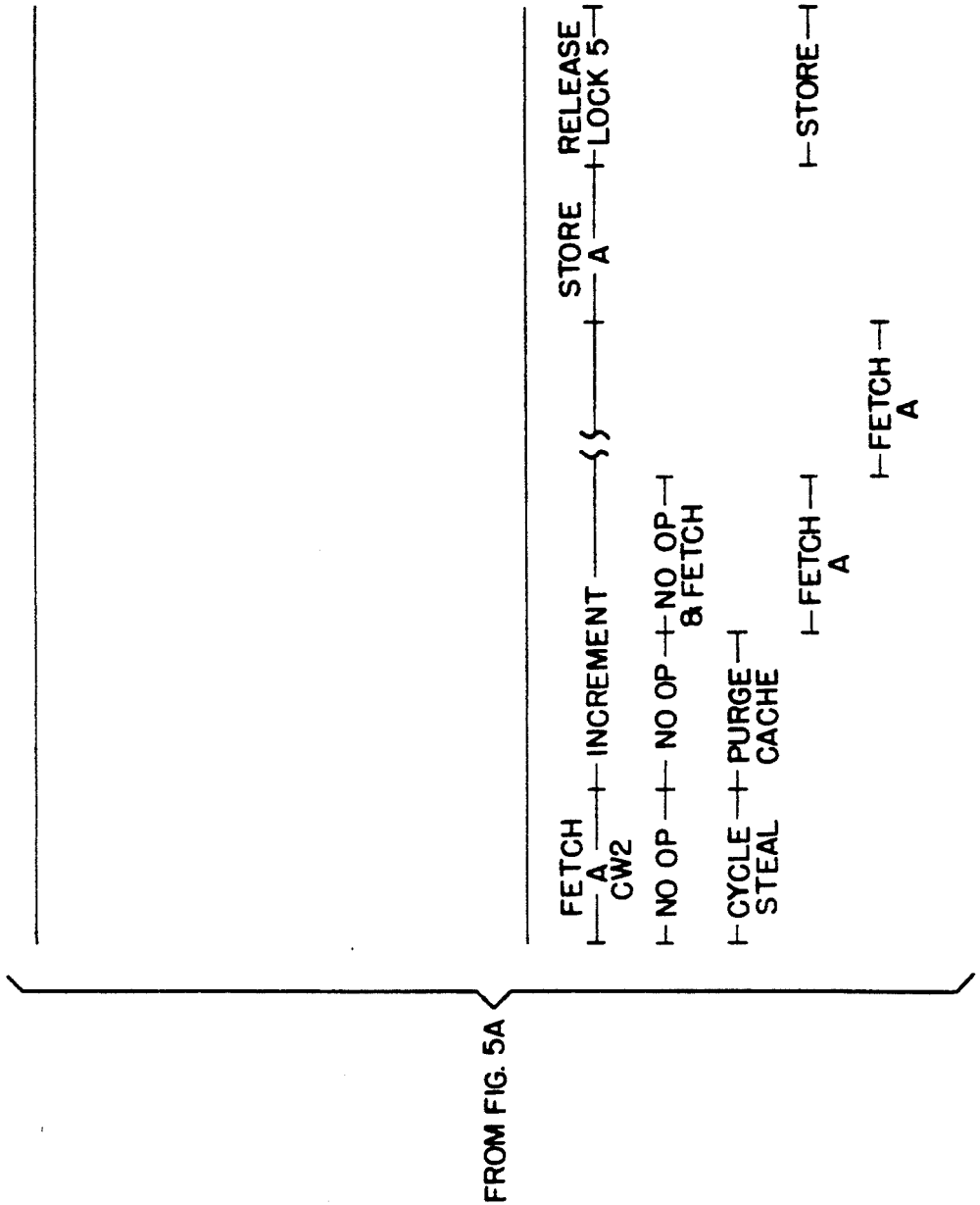

Finally, FIG. 5 is set forth to summarize and depict the desired flow of operations when setting and releasing a lock in accordance with the teachings of the invention as previously described with reference to FIG. 3.

In particular, FIG. 5 depicts the two relatively atomic instructions n+4 and m+4 depicted in FIG. 1. It should be recalled that these instructions were defined as being in the same class, with instruction m+4 to be heldoff until n+4 releases its lock.

For the sake of illustration, it is assumed that both instructions are meant to increment a specified location ("A") in storage. Line (a) of FIG. 5 shows instruction n+4 as being executed in sequence following instruction n+3. Line (b) of FIG. 5 depicts microcode words CW1-CW5 which can be used to perform the desired incrementing of storage in a relatively atomic fashion.

Line (b) of FIG. 5 can be viewed from the perspective of CSOR 302 of FIG. 3. In a first cycle, CW1 specifies that lock 5 (arbitrarily associated with this "class" of instructions) is to be set. In the next cycle, CW2 specifies that a fetch is to be performed (to an arbitrary processor register, "SA"). CW3 specifies SA is to be incremented by PU chips 303 (of FIG. 3), CW4 specifies that SA (now with the incremented value) is to be stored, and CW5 specifies that the lock (lock 5) is to be released.

Line (c) of FIG. 5 indicates the MPFIELD A data packet output by processor 0 in response to each of control words CW1-CW5. A one cycle delay is indicated between the time a control word is latched by CSOR 302 (line (b)) and the time of the MPFIELD A output. It should be noted that lock 5 is held by processor 0 for the time period indicated in line (d) of FIG. 5.

Lines (e) and (f) of FIG. 5 respectively depict the time period over which the actual fetch from A could occur (over 1 or more cycles depending on whether or not A is in cache memory) and over which the incremented value is stored to A (over 2 cycles since the store needs to be placed on the MS Bus). It is assumed in line (e) that A was fetched from cache.

Line (g) of FIG. 5 indicates the time period over which register SA is unavailable due to the fetch.

Line (h) depicts the instruction sequence m+3, etc. being executed by processor 1.

Line (i) indicates the time period over which the CSOR in processor 1 latches onto control words CW1-CW5 of sequenced instruction m+4. It should be noted that the CW2 fetch is held off until at least one cycle beyond the store in line (f), giving the system time to maintain cache coherency as described hereinbefore.

It should also be noted that the increment directed by CW3 in line (i) of FIG. 5 cannot be performed until after the proper value of A (as incremented by instruction n+4) can be fetched from main store as indicated in line (m) of FIG. 5. This could take a longer period of time then is shown in FIG. 5 where the Fetch A on the MS bus is shown occurring in the cycle following the Fetch A on the cache bus.

Lines (k) and (l) of FIG. 5 represent the described cache coherency protocol being performed within processor 1 and the subsequent fetch from main store (in line m) following the cache miss (the data was purged in line (j)) that occurs on the attempted line (1) fetch from cache.

Once the proper value of A is fetched from main store, CW4, depicted in line (i), stores A (shown in lines (1) and (m) of FIG. 5). The release (CW5 as shown in line (i)) can now be executed in the same manner as the instruction n+4 release, etc.

It should be noted that line (j) of FIG. 5 represents MPFIELD B input to processor 0 (output from processor 1) over time. These signals indicate the attempts by processor 1 to set lock 5, to perform the fetch (for instruction m+4) and to eventually release lock 5. Finally, line (n) depicts the holdoff period for processor 1 (the period from when lock 5 is set by instruction n+4, until it is released by instruction n+4, allowing time for cache coherency to be maintained).

What has been described are methods and apparatus for realizing the stated objectives of the invention. Those skilled in the art will recognize that the foregoing description of novel methods and apparatus has been presented for the purposes of illustration and description only. It is not intended to be exhaustive or to limit the invention to the precise form disclosed, and obviously many modifications and variations are possible in light of the above teaching.

For example, one class of instructions may be designed to have no constraint to run atomically relative to any instruction in any other processor in the system; classes may be defined based on operand type or location as well as instruction type, resource operated on, etc.; messages could be sent to specify which instruction class must be locked and these messages could be transmitted using an existing bus (like the main store bus) instead of using the discrete wired signal approach described hereinbefore, etc.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A computer system comprising:
   (a) at least one shared data resource;
   (b) a plurality of processors, each running a separate instruction stream concurrently with all other processors and coupled to a particular shared data resource, wherein each processor has an instruction set divided into a plurality of instruction classes each defined to have a different lock;
   (c) means for signalling between said processors to indicate to all other processors when an instruction in any one class of said plurality of classes is running on any one of said processors from its instruction stream, and for providing an indication of which particular class the instruction is a member of;
   (d) means in each of said processors for providing a further indication of the class of the instruction about to be run from its respective instruction stream; and
   (e) means in all of said processors responsive to both of said indications for selectively delaying the operation of any other instructions in said any one class on every other processor in said system so that the instruction running in said one processor locks said shared resource against use by said other instruction in said any one class.

2. Apparatus as set forth in claim 1 wherein the instruction set, in at least one of said plurality of processors, is microcoded into a control store that includes lock code information for instructions constrained to run atomically with respect to other instructions.

3. Apparatus as set forth in claim 2 wherein said lock code information includes a lock number and an indication of whether an attempt is being made to obtain or release the lock specified by the lock number.

4. Apparatus as set forth in claim 1 wherein the instruction set, in at least one of said plurality of processors, is incorporated into the processor so as to provide lock code information upon decoding of an instruction which may possibly run atomically with respect to other instructions.

5. Apparatus as set forth in claim 4 wherein said lock code information includes a lock number.

6. Apparatus as set forth in claim 4 wherein said means for signalling comprises wired interprocessor signalling means dedicated to carry said lock code information between processors.

7. Apparatus as set forth in claim 1 wherein said means for signalling comprises a shared bus.

8. Apparatus as set forth in claim 1 wherein at least one of said shared data processing resources is a shared memory.

9. Apparatus as set forth in claim 1 wherein the instruction set in one processor is the same as the instruction set in any other processor.

10. Apparatus as set forth in claim 1 wherein said instruction classes are defined in terms of instruction type.

11. Apparatus as set forth in claim 1 wherein said instruction classes are defined in terms of operand type.

12. Apparatus as set forth in claim 1 wherein said instruction classes are defined in terms of operand location.

13. Apparatus as set forth in claim 1 wherein said instruction classes are defined in terms of the data processing resource to be operated on.

14. Apparatus as set forth in claim 1 wherein said instruction classes are defined in terms of affected data structure.

15. Apparatus as set forth in claim 1 wherein the computer system is a loosely coupled multiprocessing system.

16. A computer system, including a plurality of processors each running its own separate instruction stream concurrently with those of all other processors, and including at least one data processing resource shared by said processors, comprising:
   (a) means for storing designations of a number of different instruction classes each associated with a different lock;
   (b) means for determining the class of a first instruction executing in the instruction stream of one of said processors;
   (c) means for signalling said class of said first instruction from said one processor to all others of said processors;
   (d) means responsive to said signalling means for inhibiting the execution by any other processor of an instruction in its own separate instruction stream having a lock associated with the same class as said first instruction, for a period of time sufficient to insure the execution of said first instruction; and (e) means for permitting the execution on any of said other processors of any instruction in their own respective separate instruction streams having a lock associated with a different class from that of said first instruction.

17. Apparatus as set forth in claim 16 wherein said period of time is sufficient to allow all stores resulting from the execution of said first instruction to be output from the processor on which it is running and to allow all processors in said system to maintain cache coherency in the event the processors utilize cache memory.

18. Apparatus as set forth in claim 17 further comprising lock arbitration means which keeps track of locks held by said plurality of processors and which recognizes locks that the processors are attempting to obtain or release.

19. A method, for use in a computer system that includes a plurality of processors each executing its own separate instruction stream concurrently with those of all other processors and at least one shared data processing resource, for executing predefined classes of instructions in an atomic manner with respect to instructions within a given class, comprising the steps of:
   (a) incorporating a lock specification into each of said preselected instructions wherein said specification indicates a lock number that is the same for all instructions in a given class and different for each class of instructions;
   (b) determining in any of said processors the lock number of a lock associated with one instruction executed by that processor;
   (c) obtaining from said any processor a predetermined lock associated with said number in all of said processors before executing said one instruction;

20. A method as set forth in claim 19 further comprising the steps of:
   (a) determining, prior to executing said first instruction, if any processor other then the processor on which said first instruction is to be executed is attempting to execute any member of said first class of instructions; and
   (b) arbitrating, according to a predefined priority scheme, for the lock so that at most one processor obtains specified lock.

21. A method as set forth in claim 20 further comprising the steps of:
   (a) executing said first instruction if the lock is not already held by another processor;
   (b) executing the instruction that obtains the specified lock via said step of arbitrating, if lock arbitration was performed; and
   (c) holding off, for a period of time sufficient to insure the execution of said first instruction, on the processing of (1) any instruction that attempts to obtain a lock held by another processor and (2) any instruction that does not obtain the identified lock after performing the step of arbitrating for the lock.

22. A method as set forth in claim 21 further comprising a step of executing, during said period of time, an instruction not in said first class of instructions, on at least one of said plurality of processors not otherwise on hold or executing an instruction form said first class of instructions.

23. A method as set forth in claim 22 wherein the lock held by a given instruction is released only after a period of time sufficient to assure that all stores resulting from the execution of the instruction are output from the processor on which the given instruction is being run and all processors in said system have the opportunity to maintain cache coherency in the event the processors utilize cache memory.

24. A computer system comprising:
   (a) a shared data resource;
   (b) a plurality of processors, each of said processors running a separate instruction stream in parallel with others of said processors and coupled to said shared resource, said processors having an instruction set divided into a plurality of instruction classes, each instruction in any one of said classes being assigned the same lock number, said lock number being different from that of instructions in any other of said classes;
   (c) means in each of said processors for producing an indication of the class of an instruction about to be run from that particular processor's own instruction stream;
   (d) means for signalling among all of said processors further indications of the lock numbers of instructions currently running on all said processors;
   (e) lock arbitration means responsive to said signalling means for obtaining, holding, and releasing lock numbers in said each processor corresponding to the lock numbers of said currently running instructions, and for comparing said class of said instruction about to be run in said each processor with the numbers of all said locks currently held by said lock arbitration means;
   (f) means in said each processor for selectively delaying the operation of said instruction in said each processor when the class of said instruction about to be run corresponds to the lock number of any of said held locks.

25. The system of claim 24, wherein means (f) obtains a lock in said lock arbitration means when the class of said instruction about to be run does not correspond to the lock number of any of said held locks.

26. The system of claim 24, wherein each of said processors includes a control store containing a sequence of microcode words for executing an overall function specified for each instruction in said set, and wherein at least one of said control words designates the class of said each instruction.

27. The system of claim 26, wherein one of said at least one control words contains a first indication causing said signalling means to request said arbitration means to obtain a lock corresponding to the lock number of the class of said each instruction.

28. The system of claim 27, wherein said one control word is one of the first control words in said sequence.

29. The system of claim 27, wherein another of said at least one control words contains a second indication causing said signalling means to request said arbitration means to release said obtained lock.

30. The system of claim 29, wherein said another control word is one of the last control words in said sequence.

31. The system of claim 24, wherein said system contains a bus for passing data and instructions among said processors and at least one memory means, and wherein said signalling means is separate from said bus.

32. The system of claim 24, wherein said system includes at least one further instruction belonging to none of said classes and having no assigned lock number.

33. The system of claim 24, wherein at least one of said instruction classes is defined in terms of a particular overall operation carried out by each instruction in said one class.

34. The system of claim 24, wherein at least one of said instruction classes is defined in terms of a particular type of operand processed by each instruction in said one class.

35. The system of claim 24, wherein at least one of said instruction classes is defined in terms of a particular data structure affected by each instruction in said one class.

36. The system of claim 24, wherein said system contains a plurality of shared resources, and wherein at least one of said instruction classes is defined in terms of a particular one of said shared resources affected by each instruction in said one class.

37. The system of claim 24, wherein said shared resource is a memory.

* * * * *